United States Patent [19]
Whittlesey

[11] Patent Number: 5,885,150
[45] Date of Patent: Mar. 23, 1999

[54] CONVEYOR CONSTRUCTION FOR TRANSPORTING AND FORMING TUBULAR CASING CONTAINING VISCOUS MATERIAL

[75] Inventor: Thomas E. Whittlesey, Apex, N.C.

[73] Assignee: Delaware Capital Formation, Inc., Wilmington, Del.

[21] Appl. No.: 695,945

[22] Filed: Aug. 12, 1996

[51] Int. Cl.[6] .............................. A22C 7/00; A22C 11/02
[52] U.S. Cl. ................................................ 452/35; 452/37
[58] Field of Search ........................................ 452/35, 37

[56] References Cited

U.S. PATENT DOCUMENTS

| | | | |
|---|---|---|---|
| 3,148,408 | 9/1964 | Good | 452/37 |
| 4,434,528 | 3/1984 | Niedecker | 452/37 |
| 4,675,945 | 6/1987 | Evans et al. | |
| 5,042,234 | 8/1991 | Evans et al. | |
| 5,167,567 | 12/1992 | Evans | |
| 5,330,382 | 7/1994 | Powers | 452/37 |
| 5,468,179 | 11/1995 | Stanley et al. | 452/37 |

*Primary Examiner*—Willis Little
*Attorney, Agent, or Firm*—Banner & Witcoff Ltd

[57] ABSTRACT

A conveyor system, for forming slack-filled casing into a generally uniform cross-section product uniformly along the length of the casing, includes an upper and lower conveyor assembly which are both driven by an air motor and which are adjustably spaced. The upper conveyor assembly includes a lower, supported belt run for engaging the casing product and an upper, supported belt run to form the product in an appropriate configuration and fill the casing tail.

2 Claims, 4 Drawing Sheets

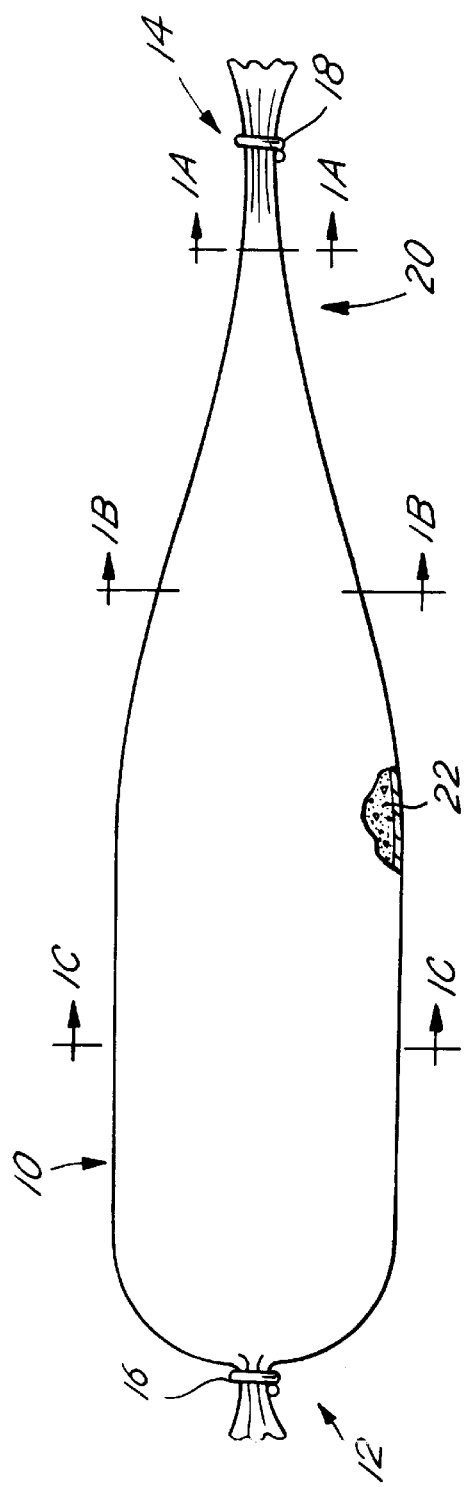
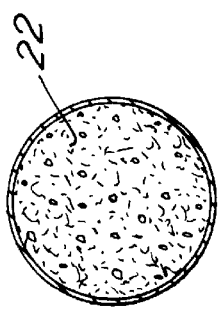
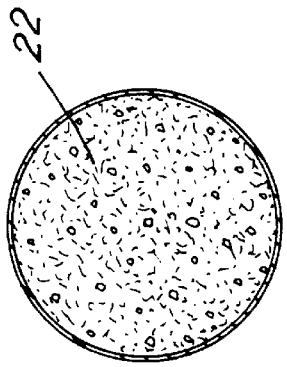

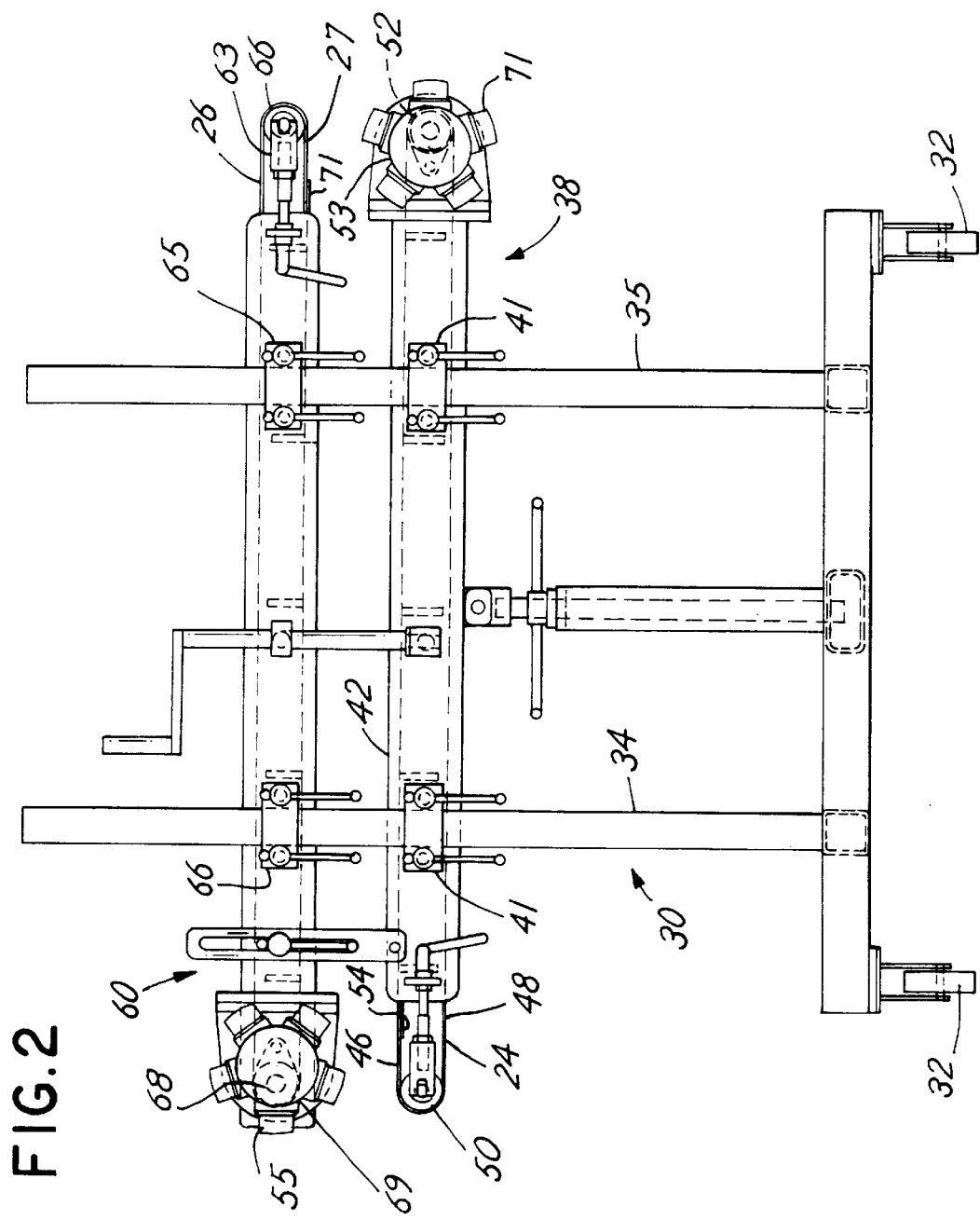

CONVEYOR CONSTRUCTION FOR TRANSPORTING AND FORMING TUBULAR CASING CONTAINING VISCOUS MATERIAL

BACKGROUND OF THE INVENTION

This invention relates to a product conveyor construction for receiving, transporting and simultaneously forming a product contained in a slack-filled casing.

A food packaging apparatus of the type for filling a casing with a viscous food product wherein the opposite ends of the casing are sealed is depicted in U.S. Pat. No. 4,675,945, incorporated herewith by reference. Apparatus of this general nature have the capability of providing slack-fill or loose-fill casings. For example, when a sausage product comprised of fine cuts of meat is pumped into a casing and the ends of the casing are sealed with a metal clip, for example, it is not unusual to only partially fill the casing with the viscous or flowable sausage product. Thereafter, the casing and its contents are shaped or formed in special forming devices to provide a commercially appealing product form. Pat. No. 4,675,945 discloses a type of apparatus which may be used for the filling of such casing and for imparting a slack-fill portion to the casing. U.S. Pat. No. 5,167,567 discloses a device which may be used in such a filling operation to adjust the tail or length of the slack-filled portion of such casing material. U.S. Pat. No. 5,042,234 discloses a packaging system in which both the casing film as well as netting material is placed on or about a viscous food product. The product may then be shaped or formed in a desired fashion and subsequently processed, for example, by smoking, cooking or the like.

Heretofore, individual units of filled casing material have been shaped by various means. For example, such individual units may be shaped in molds or by hand and then transported for further processing. It has been suggested that conveyors can be modified so as to somehow effect an appropriate shape to a slack-filled casing product. There has remained, however, the need for an improved conveyor mechanism which is capable of forming a slack-filled casing product.

SUMMARY OF THE INVENTION

In a principal aspect, the present invention comprises a conveyor system for forming slack-filled casing into a generally uniform cross-section product. The formed product will thus have a uniform cross-section along its entire length thereby filling the slack or tail portion of the casing that was originally empty or only partially filled. The conveyor system includes both an upper and lower belt conveyor, each of which are independently mounted on a support beam and each of which are adjustable in height as well as inclination. The belt conveyors each include an endless belt which fits over a powered roller and an idler roller at opposite ends of the belt loop. The axis of rotation of each roller of the upper conveyor is generally vertically aligned with the axis of rotation of a lower conveyor roller so that the conveyors include belts which operate substantially simultaneously and in the same direction when they engage and shape a casing product being transported between them. Thus, the lower conveyor includes a belt with an upper run that passes over a planer plate to thereby define the configuration of the underside or lower side of a casing product. The upper belt includes a lower run that passes over a planer plate to thereby impart compressive forces on the casing passing between the lower and upper conveyor. As a result, an elliptical or non-rounded shape is imparted to the casing material and product contents, and simultaneously, the food product or viscous material within the casing fills the tail or slack end of the casing. The upper and lower conveyors operate generally synchronously so that product shaping is effected simultaneously and equally by engagement of the casing material on the opposite sides thereof as the casing material is moved along by the conveyor belts.

Thus, it is an object of the invention to provide an improved conveyor system, which is adapted to simultaneously form casing material and food product within the casing material transported by the conveyor into a product having a generally uniform cross-section in the transverse direction.

It is a further object of the invention to provide an improved conveyor system for forming a slack-filled casing into a generally uniform cross-section product, which may be further processed.

It is yet another object of the invention to provide a conveyor system which is adjustable so as to accommodate filled casing products of various size, length and volume.

Yet a further object of the invention is to provide an improved conveyor system which is highly portable and highly adjustable, economical to fabricate and easy to incorporate in existing product lines.

Yet another object of the invention is to provide a conveyor system useful in forming sausage and similar products encased in casing as well as casing and netting material.

These and other objects, advantages and features of the invention will be set forth in the detailed description which follows.

BRIEF DESCRIPTION OF THE DRAWING

In the detailed description which follows, reference will be made to the drawing comprised of the following figures:

FIG. 1 is a schematic view of a slack-filled casing product as it is processed by means of the conveyor system of the invention;

FIG. 1A is a cross sectional view of FIG. 1 taken along the line 1A—1A;

FIG. 1B is a cross sectional view of FIG. 1 taken along the line 1B—1B;

FIG. 1C is a cross sectional view of FIG. 1 taken along the line 1C—1C;

FIG. 2 is a side elevation of the conveyor system of the invention;

DESCRIPTION OF THE PREFERRED EMBODIMENT

Figure 3:
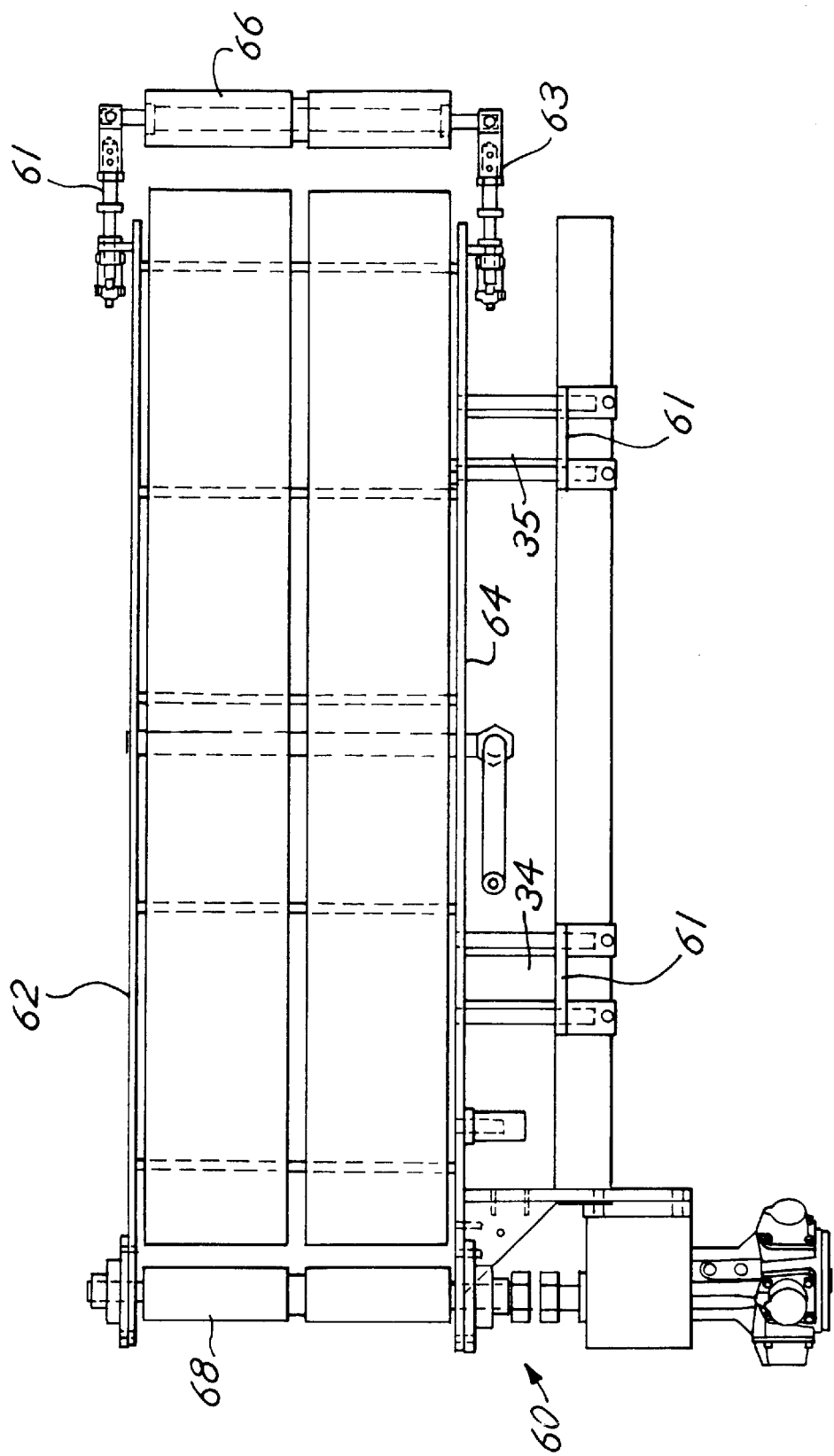
FIG. 3 is a top plan view of the conveyor of FIG. 1.

FIG. 1 illustrates the problem resolved by the present invention. Referring to FIG. 1, there is disclosed a slack-filled casing 10. The casing 10 is sealed at its opposite ends 12 and 14 by means of U-shaped metal clips 16 and 18. The mechanism for packaging and sealing food products, for example, in casing 10 is depicted as in the prior art patents previously referenced; namely, U.S. Pat. Nos. 5,167,567; 5,042,234; and 4,675,945 incorporated herewith by reference. The casing filling operation effected by such equipment provides a tail 20 which is not filled with the food product or viscous material. As depicted in FIG. 1, Section A—A, through the tail 20 includes a minimal amount of product 22. The remainder of the casing 10 is, however, more completely filled as represented by Sections B—B and C—C. Thus, for example, finely ground sausage 22 products may be filled into the casing 10. A slack-fill is provided and thus a tail 20 remains. Thereafter, it is desirable to uniformly distribute the product 22 within the interior of the casing along the longitudinal length of the casing and to do so in a manner which provides a generally uniform cross-section.

This is effected by means of the conveyor system of the present invention wherein opposed conveyor belts 24 and 26 compress against the filled casing 10 and form that casing 10 into a uniform cross-sectional shape. The uniform cross-section shape is thus a shape imparted along the entire longitudinal length of the casing 10 so that the product 22 therein will have a generally uniform configuration, which is a desired outcome with respect to food products.

Figure 4:
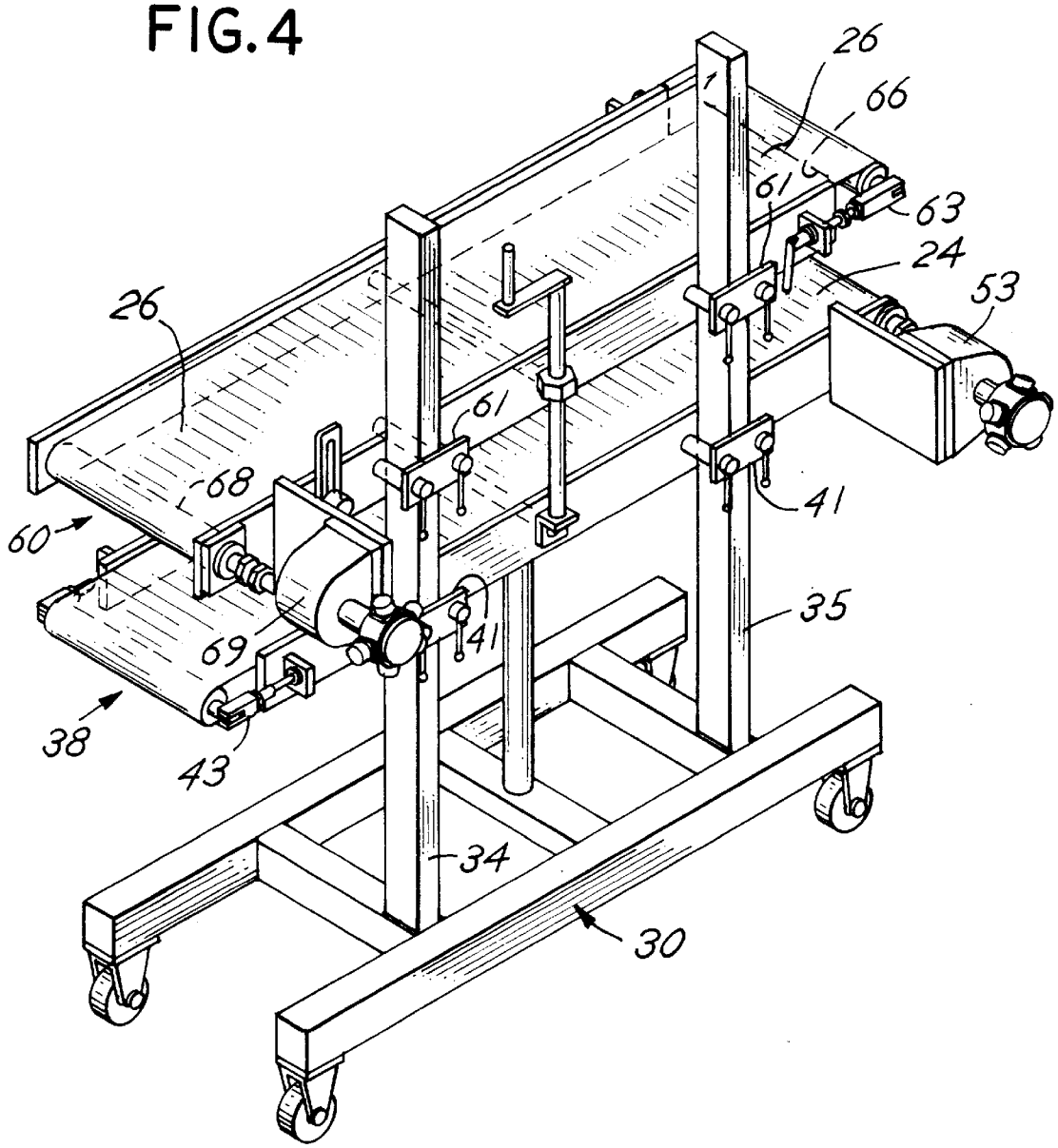
FIG. 4 is an isometric view of the improved conveyor system of the invention.

For example, FIGS. 2 through 4 illustrate in greater detail the construction of the conveyor system utilized to accomplish the objectives described with respect to FIG. 1. Referring to FIGS. 2 through 4, there is depicted a support stand 30 which includes casters or rollers 32 attached thereto so that the conveyor system may be moved in any desired position with respect to a packaging operation. The stand 30 includes vertical beams 34, 35 which adjustably support a lower conveyor assembly 38 and an upper conveyor assembly 60.

The lower conveyor assembly 38 may be adjusted in height and inclination by means of conveyor support clamps 41 attached to the beams 34, 35. The lower conveyor assembly 38 includes generally parallel, rigid side support members 40, 42. The side support members 40, 42 are attached to one another and spaced an adequate distance to provide a region therebetween in which a belt 24 having an upper run 46 and a lower run 48 may be driven. The side support member 40 and the side support member 42 are designed to be adjustable in length and thus include telescoping members 43 projecting from at least one end thereof.

An idler roller 50 is provided at the ingress end of the lower conveyor assembly 38 journaled in adjustable extension members 43. A powered or drive roller 52 is provided at the opposite end of the lower conveyor 38 journaled in side members 40, 42. Belt 24 fits over the rollers 50 and 52 is driven by the power driver roller 52. Positioned in between side members 40, 42 for support of the upper run 46 is a generally planer plate 54 which connects between the support members or side members 40 and 42 and extends substantially the length of the side members 40 and 42 so as to support thereon the upper run 46 of belt 24 and any product which is maintained on the belt 24 over upper run 46.

The upper conveyor assembly 60 includes a similar construction. That is, upper conveyor assembly 60 includes side support plates or members 62 and 64 which are spaced from one another and rigidly connected. Additionally, the side support members 62, 64 may include telescoping members 61, 63 projecting generally horizontally therefrom for adjustment of the spacing between a pair of rollers 66, 68 at opposite ends of the side supports 62, 64. Thus, the upper conveyor assembly 60 includes and idler roller 66 at the egress end thereof journaled in the extension members 61, 63 and a powered drive roller 68 at the opposite or product ingress end thereof. The upper conveyor assembly 60 is mounted on the same vertical beams 34, 35 which are attached to the stand 30. The upper conveyor assembly 60 is affixed to the beams 34, 35 by means of clamps or a connection mechanism 65 which permits adjustment of the spacing between the upper conveyor assembly 60 and the lower conveyor assembly 38 and which also permits angular or inclined adjustment of the upper conveyor assembly 60. Note that the height and inclination of the lower conveyor assembly 38 also may be adjusted by adjusting clamps 41.

The drive rollers 52, 68 are each driven by an air motor to advance the upper belt 26 or the lower belt 24 as the case may be. The belts 24, 26 are driven generally synchronously though operation of the air motors 53, 69 for the rollers 52, 68 though the motors 53, 69 are not interconnected. Rather air inlet flow controllers 55, 71 are used to match the speeds of rollers 52, 68. Note that drive roller 68 is positioned above the idler roller 50 and idler roller 66 is positioned above the power drive roller 52 so that the axes of pairs of rollers associated with the separate conveyor assemblies 38, 60 are generally parallel and are vertically aligned. Thus, the length of the upper and lower belts 24 and 26 is such that they are generally equal and overlie one another. Since the drive rollers 52, 68 are driven at the same speed, the belts 24, 26 move simultaneously in the same direction and at the same rate of speed. The distance between the upper conveyor assembly 60 and lower conveyor assembly 38 is adjustable.

The belt 26 associated with the upper conveyor assembly 60 also moves over a plate member 71. The belt 26 thus includes a lower run 27 which is designed so that it will be able to engage the top portion of filled casing 10 passing between the lower assembly 38 and upper assembly 60. Specifically, the run 27 provides for greater stress at the center of the belt 26 than at the margins. In this manner, product 22 is caused to flow longitudinally into tail 20 and transversely until the casing 10 assumes a uniform cross-sectional configuration. The configuration may be termed a "D" configuration or "D" form.

It is also noted that the rollers, which are attached to adjustable extensions 43 of the side support members such as support members 40, 42, constitute the idler rollers, and that the powered rollers are journaled tightly into the side support members 40, 42 of the lower assembly 38 and members 62, 64 of the upper assembly 60. Functionally, this arrangement enhances the structural integrity of the total system since the powered rollers 52, 68 are journaled into rigidly assembled side plates 40, 42, 62, 64.

In operation, the conveyor system of the invention may be positioned in line in a food packaging operation because it is portable and may be moved on the stand 30 to an appropriate position. The conveyor assembly 38 and upper conveyor assembly 60 are each adjusted in terms of spacing and inclination so that the assemblies 38, 60 are adapted to properly receive and form a casing 10 with contents 22. Thereafter, the drive rollers 52, 68 are operated. These rollers 52, 68 are driven by air motors and the speed of the belts associated with the respective air motors, in other words, the speed of the belts 24, 26 is adjusted so as to be equal by adjusting the flow rate of air to the air motors. It is possible that there can be some slight difference between the speeds of movement of product between the conveyor assemblies 38, 60 and; more particularly, there may be some differential in the speed of movement of the belts 24, 26. However, by using air motors, it has been found that the speeds tend to match one another when a product is inserted between the conveyor assemblies 38, 60. This matching of belt speed of belts 24, 26 is effected inasmuch as the air motors are not as precise in their rotational speed and react to frictional back pressure associated with one of the belts 24, 26 as the product 22 is moving thereon. In other words, the speed of the belts 24, 26 tend to be self-correcting to a uniform speed of both belts 24, 26 as a result of use of the air motors.

The length of the belts 24, 26 maintained in opposed relationship may be varied. Clearly, it is preferred that the length of the opposed region between the belts 24, 26 be greater than the length of the products being formed thereby. In operation, it has been found that a conveyor assembly having opposed belt runs of approximately at least 52 inches seems to be most serviceable for the manufacturer and forming and transportation of most sausage products.

Further, it is noted that the subject matter of the invention is useful not only for forming the product, but also for transporting it in a full manufacturing line or processing assembly. It may be possible to provide means for adjusting the height of the various conveyor assemblies 38, 36. Rather than a pair of support beams for each assembly 38, 60, there may be a single beam mounted on a stand. However, a pair of longitudinally spaced beams along one side of the conveyor assemblies 38, 60 is favored. Electric motors may be used to drive the belts 24, 26; although in the environment of a meat packing assembly, the use of an air motor system, which has the feature of self-correcting the speeds of belt movement is, preferred.

It's possible to vary the construction and configuration of the invention without departing from the true spirit and scope of the invention. The invention is therefore to be limited only by the following claims and their equivalents.

What is claimed is:

1. A transportable conveyor system for forming a slack-filled casing into a generally uniform cross-section, elongate product, said casing being partially filled with viscous material in a product filling apparatus and directed therefrom onto the conveyor system; said conveyor system comprising, in combination:

a transportable support stand including at least one vertical side support beam;

a lower conveyor assembly including an endless, flexible belt with an upper run, extending in a longitudinal direction to receive product at a first end of the conveyor assembly moving in the longitudinal direction, said belt extending over an idler roller at the other end and a powered drive roller at the first end, said lower conveyor assembly adjustably mounted on the side support beam by a height and inclination is adjustment bracket, said lower conveyor assembly further including a planer support surface extending longitudinally between the rollers and supporting the upper run of the belt to effect support of a product thereon and to configure the lower surface of a product moving on the lower conveyor assembly;

an upper conveyor assembly also including an upper endless flexible belt with a lower run opposed to the upper run of the lower conveyor assembly belt, said upper conveyor assembly further including an idler roller at one end of the upper belt opposed to the first end of the lower belt and a powered drive roller at the other end of the upper belt, each of said rollers of said upper conveyor assembly generally in alignment vertically with an end roller of the lower conveyor assembly, whereby the conveyors simultaneously engage the product and simultaneously shape the product, a planer support surface extending longitudinally between the upper assembly rollers, said lower run of the upper belt being supported thereby with pressure being applied on the product to thereby form the product with a generally elliptical top configuration in cross-section of the casing and for eliminating the slack-filled portion of the casing, said upper conveyor assembly also adjustably mounted on the vertical support beam by an independently adjustable bracket to control the space between the conveyor belts and the inclination of the lower run of the upper conveyor belt relative to the upper run of the lower belt; and means for driving the upper and lower conveyor belts, said means comprising a roller motor at the first end of the lower conveyor assembly and a roller motor at the other end of the upper conveyor assembly.

2. The conveyor system of claim 1 further including a pair of vertical support beams spaced longitudinally on the stand on the same lateral side of the conveyor assemblies for support of the conveyor assemblies and independent adjustable attachment brackets for attaching the conveyor assemblies to each of the beams.

* * * * *